United States Patent
Bortun et al.

(10) Patent No.: US 12,129,182 B2
(45) Date of Patent: Oct. 29, 2024

(54) NANOCRYSTAL-SIZED CERIUM-ZIRCONIUM OXIDE MATERIAL AND METHOD OF MAKING THE SAME

(71) Applicant: Pacific Industrial Development Corporation, Ann Arbor, MI (US)

(72) Inventors: Anatoly Bortun, Ypsilanti, MI (US); David Shepard, Canton, MI (US); Jin Cho, Utsunomiya (JP); Mila Bortun, Ypsilanti, MI (US); Yunkui Li, Ann Arbor, MI (US); Wei Wu, Ann Arbor, MI (US); Jeffery Lachapelle, Northville, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 725 days.

(21) Appl. No.: 17/345,121

(22) Filed: Jun. 11, 2021

(65) Prior Publication Data

US 2021/0300778 A1    Sep. 30, 2021

Related U.S. Application Data

(63) Continuation of application No. PCT/US2019/069037, filed on Dec. 31, 2019.
(Continued)

(51) Int. Cl.
*C01G 25/00* (2006.01)
*B82Y 30/00* (2011.01)
(Continued)

(52) U.S. Cl.
CPC ......... *C01G 25/006* (2013.01); *F01N 3/101* (2013.01); *B82Y 30/00* (2013.01); *B82Y 40/00* (2013.01);
(Continued)

(58) Field of Classification Search
CPC ...... C01G 25/006; B82Y 40/00; B82Y 30/00; F01N 3/101; C01P 2004/03;
(Continued)

(56) References Cited

U.S. PATENT DOCUMENTS

| 7,964,527 B2 * | 6/2011 | Larcher ............... C01G 25/006 |
|---|---|---|
| | | 423/594.12 |
| 2005/0175525 A1 | 8/2005 | Fu et al. |

(Continued)

FOREIGN PATENT DOCUMENTS

| CN | 1582198 A | 2/2005 |
|---|---|---|
| CN | 103889554 A | 6/2014 |

(Continued)

OTHER PUBLICATIONS

Zhang, Yu, Sara Andersson, and Mamoun Muhammed. "Nanophase catalytic oxides: I. Synthesis of doped cerium oxides as oxygen storage promoters." Applied Catalysis B: Environmental 6.4 (1995): 325-337.*

(Continued)

*Primary Examiner* — Richard M Rump
(74) *Attorney, Agent, or Firm* — Dickinson Wright PLLC (57) ABSTRACT

A nanocrystal-sized cerium-zirconium mixed oxide material includes at least 30% by mass zirconium oxide; between 5% to 55% by mass cerium oxide; and a total of 25% or less by mass of at least one oxide of a rare earth metal selected from the group of lanthanum, neodymium, praseodymium, or yttrium. The nanocrystal-sized cerium-zirconium mixed oxide exhibits hierarchically ordered aggregates having a $d_{50}$ particle size less than 1.5 μm and a total pore volume after calcination at a temperature of 600° C. or more that is at least 0.7 cm³/g with a fraction of pores between 2 nm to 10 nm being less than 15%. The nanocrystal-sized cerium-zirconium mixed oxide material is prepared using a co- (Continued)

precipitation method followed by milling the dried and calcined oxide material. The nanocrystal-sized cerium-zirconium mixed oxide material forms a particulate filter that may be used in an exhaust system arising from a gas or diesel engine.

20 Claims, 5 Drawing Sheets

Related U.S. Application Data (60) Provisional application No. 62/788,154, filed on Jan. 4, 2019.

(51) Int. Cl.
  *B82Y 40/00* (2011.01)
  *F01N 3/10* (2006.01)
(52) U.S. Cl.
  CPC ...... *C01P 2004/03* (2013.01); *C01P 2004/45* (2013.01); *C01P 2004/61* (2013.01); *C01P 2004/62* (2013.01); *C01P 2004/64* (2013.01); *C01P 2006/12* (2013.01); *C01P 2006/14* (2013.01)
(58) Field of Classification Search
  CPC .............. C01P 2004/45; C01P 2004/61; C01P 2004/62; C01P 2004/64; C01P 2006/12; C01P 2006/14
  See application file for complete search history.

(56) References Cited

U.S. PATENT DOCUMENTS

| | | |
|---|---|---|
| 2007/0264486 A1 | 11/2007 | Verdier |
| 2014/0140909 A1 | 5/2014 | Qi et al. |
| 2018/0266289 A1 | 9/2018 | Otsuka et al. |
| 2018/0304235 A1* | 10/2018 | Harris .................. B01J 37/031 |

FOREIGN PATENT DOCUMENTS

| | | | | |
|---|---|---|---|---|
| CN | 103191712 B | * | 12/2014 | ............ B01J 23/10 |
| CN | 108349744 A | | 7/2018 | |
| GB | 2545747 A | | 6/2017 | |
| JP | 2000271480 A | | 10/2000 | |
| JP | 2019501092 A | | 1/2019 | |
| WO | 9845212 A1 | | 10/1998 | |
| WO | 2014161204 A1 | | 10/2014 | |
| WO | 2015121248 A1 | | 8/2015 | |
| WO | 2017072509 A1 | | 5/2017 | |
| WO | 2017185224 A1 | | 11/2017 | |
| WO | 2019136343 A1 | | 7/2019 | |

OTHER PUBLICATIONS

European Patent Office, Rijswijk, Netherlands, International Search Report of International Application No. PCT/US2019/069037, Mailed Apr. 20, 2020, 4 pages.

* cited by examiner

NANOCRYSTAL-SIZED CERIUM-ZIRCONIUM OXIDE MATERIAL AND METHOD OF MAKING THE SAME

CROSS REFERENCE TO RELATED APPLICATIONS

This application is a continuation of International Application Serial No. PCT/US2019/069037 filed Dec. 31, 2019, designating the United States and published in English, which claims the benefit of the filing date under 35 U.S.C. § 119(e) of U.S. Provisional Application No. 62/788,154 filed Jan. 4, 2019, the entire contents of each of which are hereby incorporated herein by reference.

FIELD

The invention generally relates to inorganic complexes, especially to catalyst support materials having oxygen storage capacity and high thermal stability, their method of manufacture and applications thereof. The materials of this disclosure are capable of being incorporated into particulate filters used in flow through three-way catalyst (TWC) and wall-through gasoline or diesel engine exhaust catalytic converters.

BACKGROUND

The statements in this section merely provide background information related to the present disclosure and may not constitute prior art.

A typical wash coat includes a catalyst support of gamma, delta, and theta alumina or lanthanum (La) stabilized alumina, ceria-zirconia with oxygen storage capacity and platinum group metals (PGM), such as Pt, Pd, and Rh introduced by nitrate solutions. The PGM may be coated onto a cordierite honeycomb substrate, combined in a slurry mixture that comprises the catalyst support material and oxygen storage material, or coated as a separate step following the application of the washcoat slurry (catalyst support material and oxygen storage material) to make the catalyst. The function of the catalyst is to change the composition of a mobile engine exhaust from carbon monoxide (CO), all kinds of hydrogen carbon compounds (HC), and nitrogen oxygen compounds ($NO_x$) to innocuous carbon dioxide ($CO_2$), water ($H_2O$), and Nitrogen ($N_2$).

As an important composition of a three-way catalyst (TWC), zirconia-stabilized ceria and other ceria based oxides play a major role in oxygen storage and release under lean and rich fuel conditions, thereby, enabling the oxidation of CO and volatile organics and the reduction of $NO_x$. High efficient catalytic performance also relates to high specific surface area and thermal stability, as well as high oxygen storage capacity.

Pure ceria is the best oxygen storage material, but its poor thermal stability limits its application at high temperature. Zirconia stabilized ceria, $CeO_2$—$ZrO_2$, has improved the materials' thermal stability and oxygen storage capacity compared with $CeO_2$. The complex oxide with a molar ratio of Ce to Zr of 1:1 can form a solid solution $Ce_{0.5}Zr_{0.5}O_2$ of cubic phase, which improves OSC performance. Nevertheless, the thermal stability of this kind of material is poor after aging at high temperature, for example, after aging at 1000° C. for several hours, the specific surface area of this material will typically be less than 30 m²/g.

Alumina is one example of a thermal stabilizer additive for use with $CeO_2$—$ZrO_2$. Other additives include alkaline earth, rare earth and silicon elements or mixture thereof. The total amount of such stabilizers added is usually controlled to be less than 10 wt. % based on the entire amount of oxides present. However, more recently, up to 90 wt. % alumina has been added into $CeO_2$—$ZrO_2$ for improving thermal stability and OSC. The introduction of alumina into Ce—Zr oxide results in efficient improvement of thermal stability and OSC. Accordingly, there exists a desire to provide new types of catalyst support materials having high thermal stability and high OSC for use in catalytic converters.

SUMMARY

This disclosure generally provides a composition for a catalyst support material having oxygen storage capacity and high thermal stability, as well as a method of manufacture and applications thereof. The materials of this disclosure are capable of being incorporated into particulate filters used in flow through three-way catalyst (TWC) and wall-through gasoline or diesel engine exhaust catalytic converters.

A nanocrystal-sized cerium-zirconium mixed oxide comprises at least 30% by mass zirconium oxide; between 5% to 55% by mass cerium oxide; and a total of 25% or less by mass of at least one oxide of a rare earth metal selected from the group of lanthanum, neodymium, praseodymium, or yttrium. The nanocrystal-sized cerium-zirconium mixed oxide exhibits hierarchically ordered aggregates having a $d_{50}$ particle size less than 1.5 µm; a total pore volume after calcination at a temperature of 600° C. or more that is at least 0.7 cm³/g with a fraction of pores between 2 nm to 10 nm being less than 15%. The hierarchically ordered aggregates consist of oxide crystallites having a size ranging from 5 nm to 20 nm. The pore size distribution in the nanocrystal-sized cerium-zirconium mixed oxide material remains unchanged over the temperature range from 600° C. to 1,100° C. This cerium-zirconium mixed oxide material also exhibits a specific surface area (SSA) after ageing at 1,000° C. for 5 hours that is at least 40 m²/g; alternatively, at least 50 m²/g.

According to another aspect of the present disclosure, a method of forming a nanocrystal-sized cerium-zirconium mixed oxide material is provided. This method comprising the steps of:
- (a) preparing an acidic solution containing polymerized zirconium oligomers;
- (b) mixing an acidic solution of cerium and rare earth salts with the zirconium containing solution to make a polyvalent metal containing mixture;
- (c) mixing the acidic polyvalent metal containing mixture with a solution of a complexing reagent;
- (d) allowing the mixture formed in step (c) to form a zirconium-based precursor slurry containing constituent metal hydroxides;
- (e) neutralizing the zirconium containing precursor slurry with a base to achieve co-precipitation of the constituent metal hydroxides and formation of a precipitated mixed oxide material;
- (f) washing the precipitated mixed oxide material with water to remove unreacted cationic and anionic admixtures;
- (g) collecting the washed, precipitated mixed oxide material;
- (h) ageing the washed, precipitated mixed oxide material at ambient temperature or at an elevated temperature for a predetermined time;
- (i) drying the aged mixed oxide material;

(j) calcining the dry, aged mixed oxide material to form the cerium-zirconium mixed oxide material; and (k) milling the calcined cerium-zirconium mixed oxide material to a $d_{50}$ particle size of less than 1.5 μm.

In this method, the milling of the calcined cerium-zirconium mixed oxide material yields a $d_{50}$ particle size of less than 500 nm. The complexing reagent comprises anions have an affinity towards zirconium and are selected from the group consisting of a sulfate, an oxalate, a succinate, a fumarate, and combinations thereof.

The amount of complexing reagent and the amount of zirconium in the acidic polyvalent metal containing mixture that forms the zirconium-based precursor slurry are present such that the molar ratio of complexing agent to zirconium is in the range of about 0.35 to about 1.05; alternatively, in the range of about 0.35 to about 0.85.

According to yet another aspect of the present disclosure, a particulate filter may be formed using the nanocrystal-sized cerium-zirconium mixed oxide. The nanocrystal-sized cerium-zirconium mixed oxide may be applied as a wash-coat to a substrate in order to form the particulate filter. The particulate filter may be used in a three-way catalytic converter (TWC) application, a gasoline particulate filter (GPF) application, or a diesel particulate filter (DPF) application.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the nanocrystal-sized cerium-zirconium mixed oxide material made and used according to the teachings contained herein is described throughout the present disclosure in conjunction with a particulate filter for use in an automotive exhaust catalytic converter in order to more fully illustrate the structural elements and the use thereof. The incorporation and use of such a mixed oxide material in other applications, including without limitation as a catalyst support in various industrial processes, is contemplated to be within the scope of the present disclosure. It should be understood that throughout the description and drawings, corresponding reference numerals indicate like or corresponding parts and features.

For the purpose of this disclosure, the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

The present disclosure generally provides a nanocrystal-sized ceria-zirconia mixed oxide material, which is suitable for use in flow-through three-way catalyst (TWC) converters and wall-through gasoline particulate filter (GPF) or diesel-particulate-filter (DPF) applications. The cerium-zirconium mixed oxide material exhibits facile oxygen storage mobility. A specific feature of the nanocrystal-sized cerium-zirconium mixed oxide material is that it exhibits a specific surface area (SSA) before and after aging at 1,000° C. for 5 hours, wherein the SSA after aging is maintained to be greater than 85% of the SSA before aging. The SSA of the nanocrystal-sized cerium-zirconium mixed oxide material is greater than 40 m²/g after aging at 1000° C. with a $D_{50}$ particle size that after milling is less than 1.5 μm. The nanocrystal-sized cerium-zirconium mixed oxide material comprises, consists of, or consists essentially of oxide crystallites having a size ranging from 5 nm to 20 nm that are assembled into hierarchically ordered aggregates with a particle size less than 1.5 μm; alternatively, less than 500 nm; alternatively, less than about 200 nm.

The nanocrystal-sized cerium-zirconium mixed oxide material comprises, consists of, or consisted essentially of a mixture of zirconium oxide, cerium oxide and at least one oxide of rare earth metal. The rare earth metal may be, without limitation, lanthanum, neodymium, praseodymium, or yttrium. Alternatively, the rare earth metal is selected to be either lanthanum, neodymium, praseodymium, or yttrium. According to one aspect of the present disclosure, the composition of the nano-crystal-sized cerium-zirconium mixed oxide material generally includes at least 30% by mass zirconium oxide; between 5% to 55% by mass cerium oxide; and a total of 25% or less by mass of at least one oxide of a rare earth metal. Alternatively, the composition of the cerium-zirconium mixed oxide material includes at least 35% by mass zirconium oxide; alternatively, at least 40% by mass zirconium oxide. Alternatively, the amount of the rare earth metal oxide in the cerium-zirconium mixed oxide material ranges from about 1% to 25% by mass; alternatively, between 5% and 20% by mass.

Figure 1:
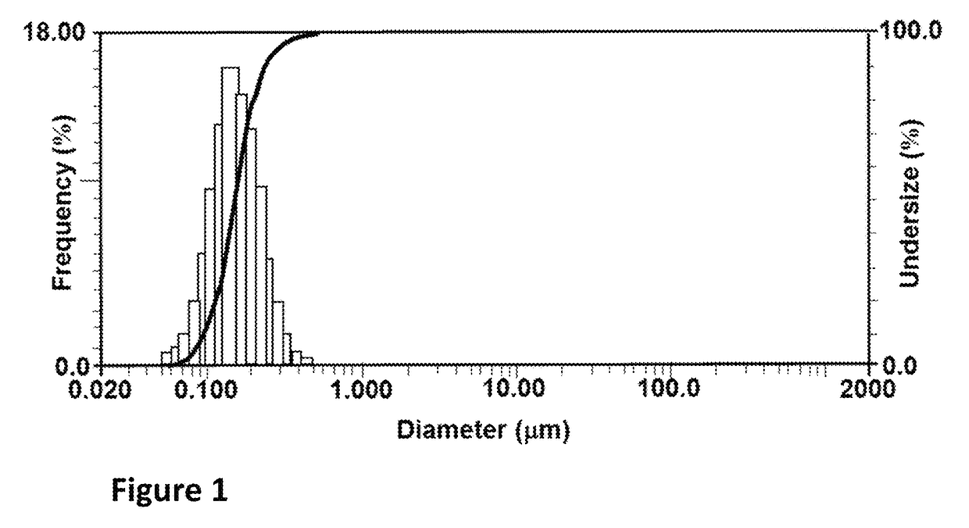
FIG. 1 is a graphical representation of the particle size distribution measured for a cesium-zirconium mixed oxide material after milling.

The nanocrystal-sized cerium-zirconium mixed oxide material exhibits hierarchically ordered aggregates having a $D_{50}$ particle size less than 1.5 μm consisting of oxide crystallites having a size ranging from 5 nm to 20 nm. Alternatively, the $D_{50}$ particle size of the hierarchically ordered aggregates is less than 1 micrometer (μm); alternatively, less than about 500 nanometers (nm); alternatively, less than about 300 nm; alternatively, 200 nm or less. Referring to FIG. 1, the particle size measured for one batch of cerium-zirconium mixed oxide material formed according to the teachings of the present disclosure is shown to be less than 500 nm with the greatest amount being less than about 200 nm. The particle size distribution may be measured using any known conventional technique, including but not limited to using a laser particle size analyzer.

The nanocrystal-sized cerium-zirconium mixed oxide material exhibits a specific surface area (SSA) after ageing at 1,000° C. for 5 hours that is at least 40 $m^2/g$. Alternatively, the specific surface area (SSA) after ageing at 1,000° C. for 5 hours is at least 50 $m^2/g$; alternatively, 55 $m^2/g$ or higher.

The nanocrystal-sized cerium-zirconium mixed oxide material exhibits a total pore volume after calcination at a temperature of 600° C. or more that is at least 0.7 $cm^3/g$ with a fraction of pores between 2 nm to 10 nm being less than 15%. Alternatively, the cerium-zirconium mixed oxide material exhibits a total pore volume after calcination at 1,000° C. is at least 0.4 $cm^3/g$ and the fraction of pores between 2 nm and 10 nm is less than 10%.

Figure 2:
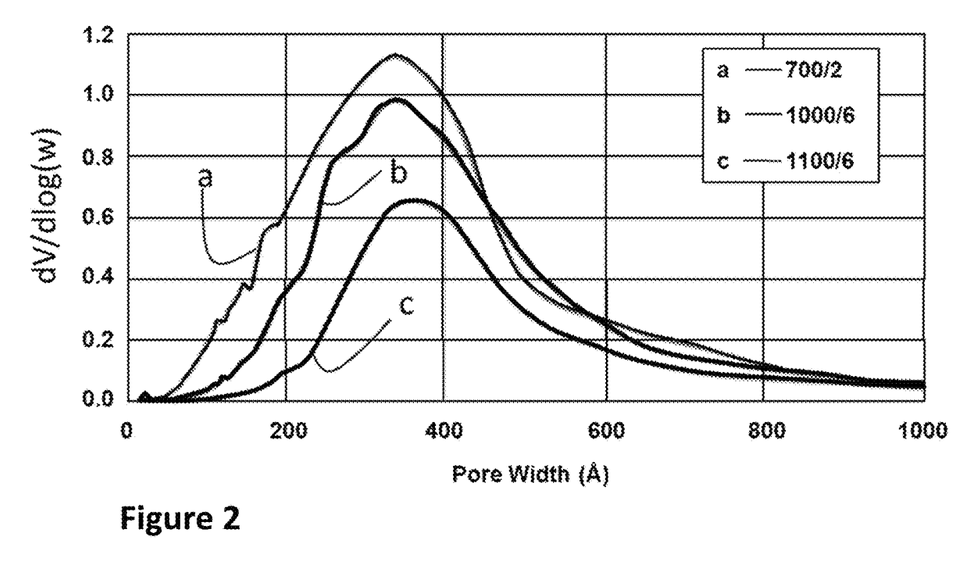
FIG. 2 is a graphical representation of the Dore size distribution measured for unmilled cesium-zirconium mixed oxide materials prepared according to the teachings of the present disclosure.

The nanocrystal-sized cerium-zirconium mixed oxide also exhibits a pore size distribution that remains unchanged over the temperature range from 600° C. to 1,100° C. Referring now to FIG. 2, the pore size distribution is compared for the cerium-zirconium mixed oxide aged at (a) 700° C. for 2 hours; (b) 1,000° C. for 6 hours; and (c) 1,100° C. for 6 hours. The pore size distribution shown in (a), (b), and (c) remain essentially unchanged.

The specific surface area (SSA) and pore volume (PV) measured for the nanocrystal-sized cerium-zirconium mixed oxide material before aging is retained after aging or calcination at 1,000° C. or higher for at least 6 hours at a level that is at least 70% of the SSA and PV measured prior to aging. Alternatively, the SSA and PV is retained after aging at a level that is at least 75%; alternatively, at least 85% of the SSA and PV measured before aging. The specific surface area (SSA) and pore volume (PV) may be measured using a conventional Brunauer, Emmett, and Teller (BET) method.

Figure 3:
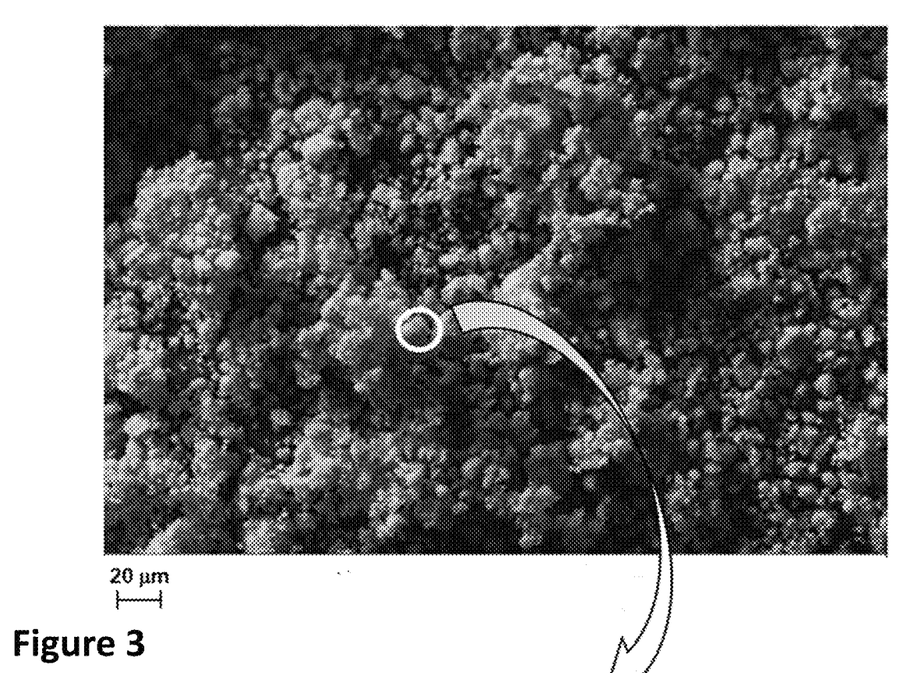
FIG. 3 is a scanning electron micrograph (SEM) image of the texture of cesium-zirconium mixed oxide materials or powder prepared according to the teachings of the present disclosure.
Figure 4:
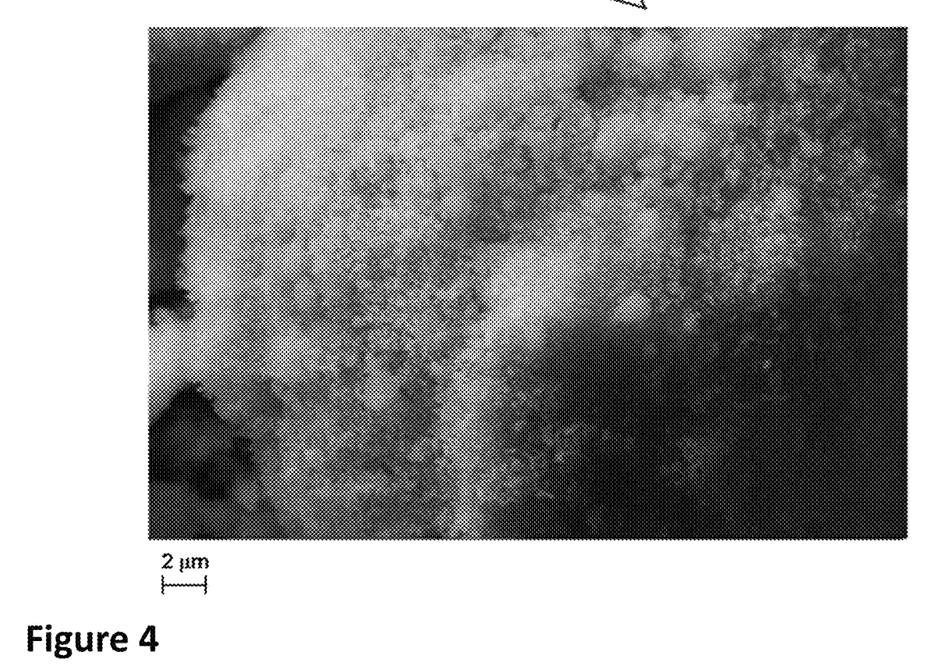
FIG. 4 is another scanning electron micrograph (SEM) image of the cesium-zirconium mixed oxide material of FIG. 3 at a higher magnification.

Referring now to FIG. 3, an image of the cerium-zirconium mixed oxide material prepared according to Example 1 is provided as measured via scanning electron microscopy (SEM). The cerium-zirconium mixed oxide is observed as a powdered material comprising, consisting of, or consisting essentially of agglomerates having irregular or quasi-globular shapes of variable size ranging from about 2-3 micrometers (μm) up to about 10-15 μm. An SEM image of one such micron-size agglomerate taken at higher magnification as shown in FIG. 4 reveals that the agglomerate actually exhibits a complex fine structure. This complex fine structure is formed with nano-sized particles having dimensions ranging from about 50 nanometers (nm) to about 200 nm. Since the cerium-zirconium mixed oxide is a crystalline material with an average crystallite size of about 5 up to about 20 nm as determined by x-ray diffraction (XRD) and/or transmission electron microscopy (TEM) data, the cerium-zirconium mixed oxide comprises a hierarchically ordered structure.

Another aspect of the present disclosure features a precipitation method of making the nanocrystal-sized cerium-zirconium mixed oxide material. This method generally comprises the preparation of a solution containing pre-polymerized zirconium oligomers, cerium, rare earth and transition metal salts that can interact with a complexing reagent having affinity towards zirconium and form a zirconium-based precursor. The co-precipitation of all constituent metal hydroxide present in this precursor with a base, followed by collecting, washing, and drying of the material. After subjecting the cesium-zirconium mixed oxide material to a milling process a nanocrystal-sized material is obtained.

Figure 5:
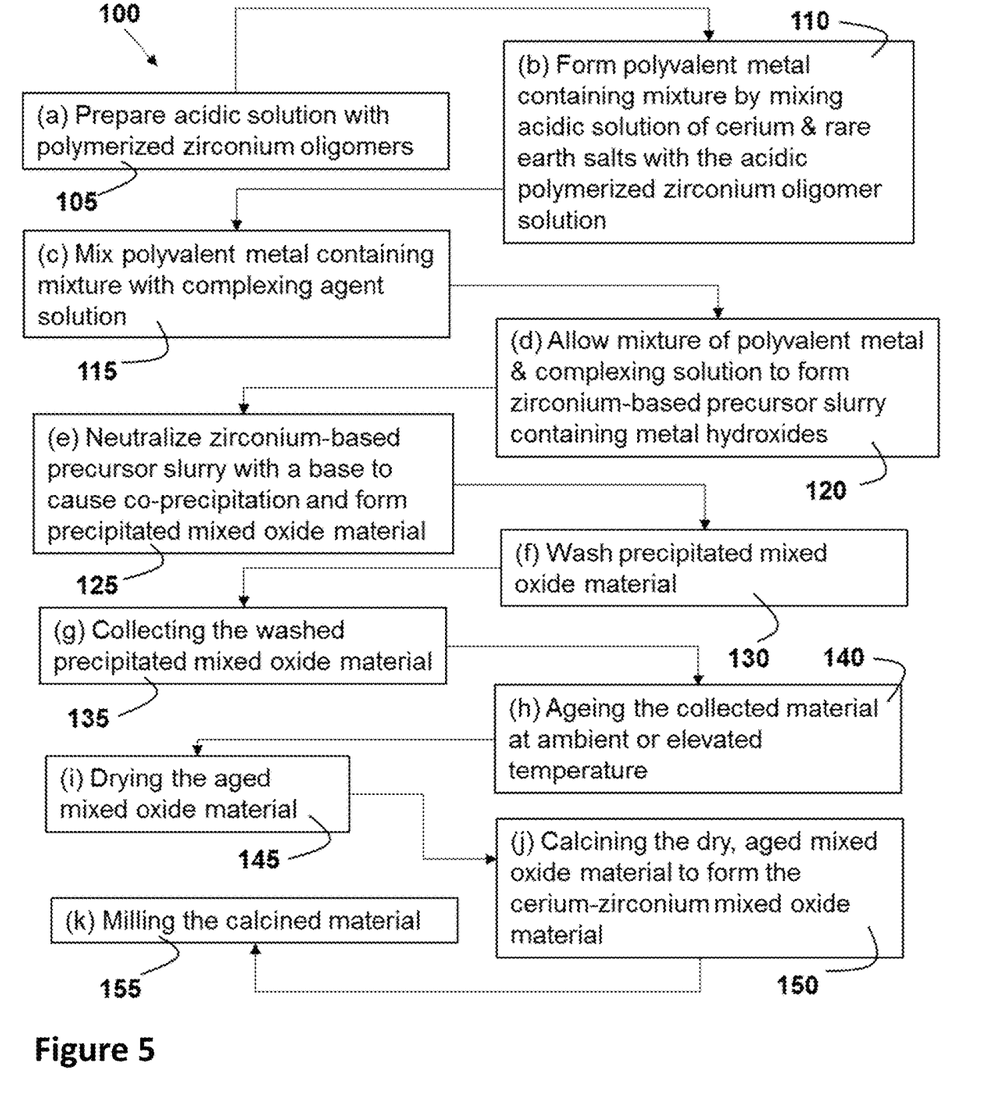
FIG. 5 is a flowchart of a method for forming cesium-zirconium mixed oxide materials.

Referring now to FIG. 5, the method of preparing the nanocrystal-sized cerium-zirconium mixed oxide material is described in detail. This method 100 comprises the steps of (a)-(k) as described in FIG. 5 and as further defined herein. Step (a) includes preparing 105 an acidic solution containing polymerized zirconium oligomers. Then in step (b) an acidic solution of cerium and rare earth salts is mixed 110 with the zirconium oligomer containing solution to make a polyvalent metal containing mixture. In step (c) the acidic polyvalent metal containing mixture is mixed 115 with a solution of a complexing reagent. The mixture formed in step (c) is then allowed 120 in step (d) to react and form a zirconium-based precursor slurry containing constituent metal hydroxides. The zirconium containing precursor slurry is then neutralized 125 in step (e) with a base to achieve co-precipitation of the constituent metal hydroxides and the formation of a precipitated mixed oxide material. In step (f), the precipitated mixed oxide material is washed 130 with water to remove any unreacted cationic and anionic admixtures. The washed, precipitated mixed oxide material is then collected 135 in step (g) and subjected in step h) to ageing 140 at ambient temperature or at an elevated temperature for a predetermined amount of time. The aged mixed oxide is then dried 145 in step (i) and then calcined 150 in step (j) to form the cerium-zirconium mixed oxide material. Finally, in step (k) the calcined cerium-zirconium mixed oxide material is milled 155 to reduce particle size. After milling the $D_{50}$ particle size of the nanocrystal-sized cerium-zirconium mixed oxide material is less than 1.5 μm; alternatively, less than 1.0 μm; alternatively, less than 500 nm; alternatively, less than 300 nm; alternatively, less than about 200 nm.

In step (a), the polymerized zirconium oligomers may comprise, without limitation, zirconium octamers. These zirconium octamers may be present in an amount ranging from about 30% to 100% by mass of zirconium oligomers. According to one aspect of the present disclosure, the polymerized zirconium oligomers do not contain zirconia sol particles.

In step (b), the acidic solution of cerium and rare earth metal salts may formed using one or more water soluble salts of cerium and rare earth metals in which the anions are nitrates, chlorides, sulfates, acetates, or a combination thereof.

In step (c), the complexing reagent may comprise anions that have an affinity towards zirconium. The complexing agent may be selected from the group consisting of a sulfate, an oxalate, a succinate, a fumarate, and combinations thereof. The amount of complexing reagent and the amount of zirconium present in the acidic polyvalent metal containing mixture that is used to form the zirconium-based precursor slurry in step (d) are present such that the molar ratio of the complexing agent to zirconium is in the range of about 0.35 to about 1.05; alternatively, in the range of about 0.35 to about 0.85.

In step (e), the base used to neutralize the zirconium-based precursor slurry may be selected from the group of alkali metal hydroxides, aqueous ammonia, and tetraalkylammonium hydroxide. Alternatively, the base may include ammonia solution, ammonium carbonate, and ammonium hydrogen carbonate or their mixture. During the co-precipitation, the pH may be selected to be in the range of about 6.0 to about 10.0, alternatively in the range of about 6.0 to about 9.0; and the precipitation temperature selected to be in the range of about 40 to 90° C.

The precipitate is filtered (step g), washed (step f) and finally dried (step i) with or without surfactants to obtain cerium-zirconium mixed oxide material. When utilized, the surfactants may include anyone or a combination of polyvinyl alcohol (PVA), polyvinyl amine, polyethylene glycol-200 (PEG-200), isopropyl alcohol (IPA), ethanol, and melamine with the dosage or amount ranging from about 1% to about 30%, alternatively about 6 to about 10%.

The dried, aged mixed oxide material is calcined at about 500° C. to about 1100° C. for about 2-6 hours to form the cerium-zirconium mixed oxide material in the form of a powder. Alternatively, the dried, aged mixed oxide material is calcined at about 600 to about 800° C. for about 3-5 hours.

According to another aspect of the present disclosure, the nanocrystal-sized cerium-zirconium mixed oxide material having the composition and properties described above is used to form a particulate filter. Alternatively, a particulate filter is formed using the nanocrystal-sized cerium-zirconium oxide material prepared according to the method of FIG. 5. This particulate filter may be used in a flow through three-way catalytic converter (TWC) application, a gasoline particulate filter (GPF) application, or a diesel particulate filter (DPF) application.

Figure 6A:
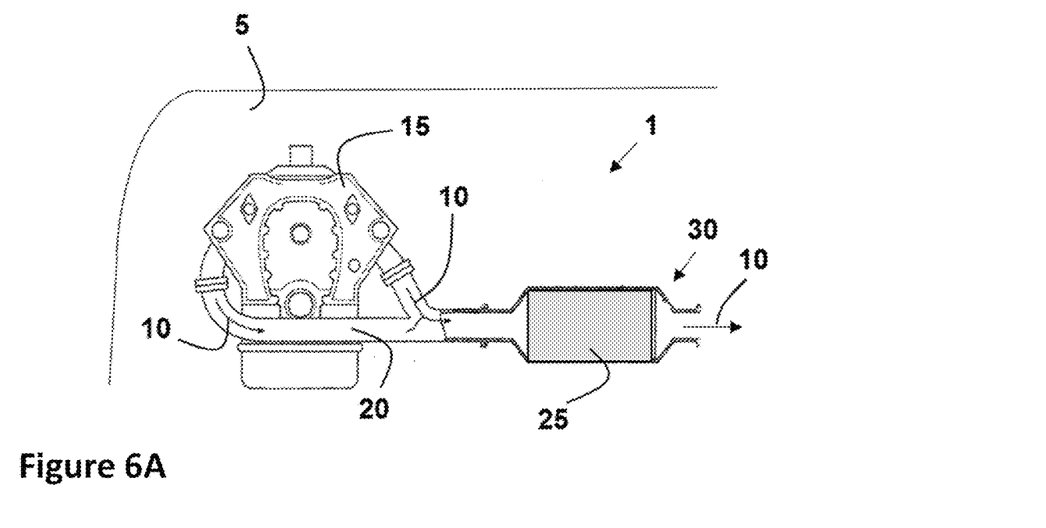
FIGS. 6A and 6B represent perspective views of a vehicle's exhaust system with a particulate filter formed according to the teachings of the present disclosure.
Figure 6B:
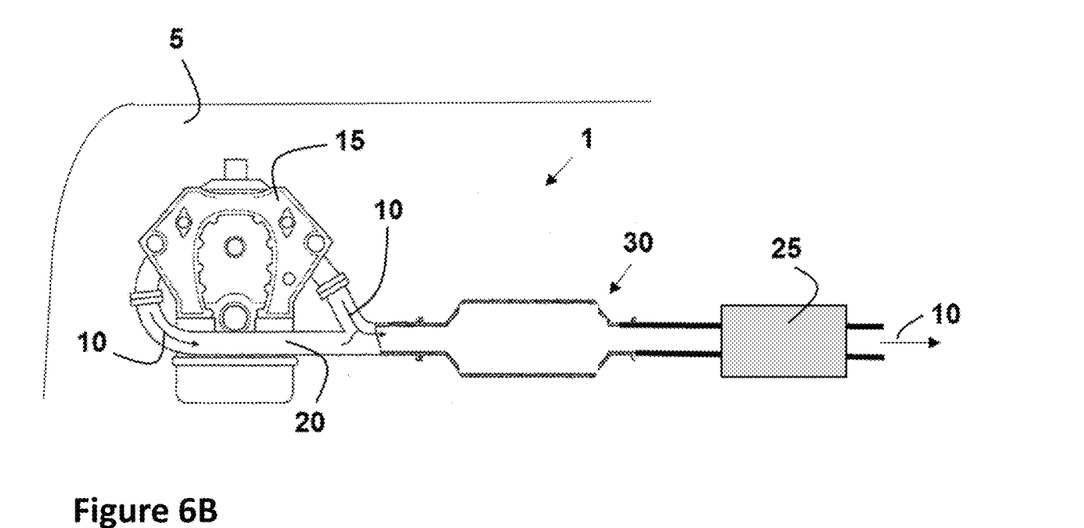

The nanocrystal-sized cerium-zirconium mixed oxide material may be used to create a catalyst composition in the form of self-supporting particulates, a monolithic structure, or as one or more washcoats disposed on to the surface of a substrate to form the particulate filter. Referring now to FIGS. 6A and 6B, an exhaust system 1 for a vehicle 5 is shown in which an exhaust gas 10 passes from the vehicle's engine 15 through a pipe or ductwork 20 and through a particulate filter 25. This particulate filter 25 may be incorporated as part of a three-way catalytic (TWC) converter 30 as shown in FIG. 6A or positioned in-line therewith (FIG. 6B).

The catalyst composition generally includes the nanocrystal-sized cerium-zirconium oxide alone or with the incorporation of one or more platinum group metals. The washcoat may further comprise a binder material, such as alumina, silica, (non-zeolite) silica-alumina, naturally occurring clays, $TiO_2$, $ZrO_2$, and $SnO_2$.

The substrate or monolithic structure may comprise any ceramic or metal honeycomb structure that has one or more gas flow passages extending there through. A honeycomb shape for a monolith substrate provides a large catalytic surface having a minimal overall size and pressure drop. The catalyst composition may be applied to a portion of the structure walls that define said passages such that the gases flowing through the passages contact the catalyst composition. The flow passages are thin-walled channels having any desired cross-sectional shape or size such, including but not limited to, trapezoidal, rectangular, square, oval, and circular.

One skilled in the art will understand that the substrate may also be a wall-flow filter substrate, in which the flow passages are alternately blocked, such that the gases are only allowed to flow in one general direction. Thus, use of a wall flow substrate provides the added benefit of being able of remove particulate matter from the flowing gases along with gaseous pollutants. The wall-flow filter substrate may be made from materials commonly known in the art, such as cordierite, aluminum titanate or silicon carbide, to name a few. The amount of the catalyst composition that is applied to the wall flow substrate will depend on substrate's properties such as porosity and wall thickness.

The specific examples provided in this disclosure are given to illustrate various embodiments of the invention and should not be construed to limit the scope of the disclosure. The embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

EXAMPLE 1: Preparation of Cerium-Zirconium Oxide Material Comprising 30% $CeO_2$-60% $ZrO_2$-5% $La_2O_2$-5% $Pr_6O_{11}$ A total of 76.6 grams of $ZrOCl_2*8H_2O$ and 37.9 grams of $Ce(NO_3)_3*6H_2O$ crystals are dissolved in 1,000 grams of deionized (DI) water. Then, 9.1 grams of a 27.4 wt. % praseodymium nitrate solution and 9.3 grams of a 26.85 wt. % lanthanum nitrate solution are added to the cerium-zirconium containing solution to form a polyvalent metal-containing solution. A total of 78 grams of a 10 wt. % NaOH solution is then added to the polyvalent metal-containing solution and mixed until the solution becomes clear. Finally, a total of 9.6 grams of $(NH_4)_2SO_4$ and 6.9 grams of $(NH_4)_2C_2O_4$ crystals dissolved in 200 grams of deionized (DI) water is added to the polyvalent metal mixture followed by the slow addition of a 20 wt. % NaOH solution until the basicity of the reaction mixture reaches a pH of 13. The precipitate that forms is then filtered using a Buchner funnel and washed with deionized water to remove excess of cations and/or anions.

The wet, collected precipitate is dried in an oven at 130° C. for about 12 hours and then calcined in air at 700° C. for 2 hours. The calcined mixed oxide is then additionally aged at 1,000° C. for 6 hours and 1,100° C. for 6 hours. The pore radius for the material is measured after calcination at 700° C. and after additional ageing at 1,000° C. and 1,100° C. (see FIG. 2).

The cerium-zirconium mixed oxide calcined at 700° C. may be re-slurried in DI water to make 20 wt. % slurry and then wet-ball milled using a jar mill to a particle size having a $d_{50}$=150 nm (see FIG. 1). The milled cerium-zirconium mixed oxide is collected and dried in an oven at 110° C. for about 12 hours and then calcined in air at 700° C. for 2 hours. The calcined milled mixed oxide is then additionally aged at 1,000° C. and 1,100° C. for 6 hours.

Specific surface area (SSA) and pore volume (PV) of the milled and un-milled cerium-zirconium mixed oxide after calcination at 1,000° C. and 1,100° C. are summarized in the Table 1.

TABLE 1

|  | SSA-1000, $m^2$/g | PV-1000, cc/g | SSA-1100, $m^2$/g | PV-1100, cc/g |
| --- | --- | --- | --- | --- |
| Un-milled | 51.7 | 0.41 | 25.3 | 0.23 |
| Milled | 43.3 | 0.33 | 21.4 | 0.18 |
| Change, % | −16 | −20 | −15 | −22 |

EXAMPLE 2: Preparation of Cerium-Zirconium Oxide Material Comprising 8% $CeO_2$-76% $ZrO_2$-3.5% $La_2O_3$-12.5% $Y_2O_3$ A solution containing zirconium (Zr), cerium (Ce), lanthanum (La), and yttrium (Y) salts is prepared by mixing 97.0 grams of $ZrOCl_2*8H_2O$, 10.1 grams of $Ce(NO_3)_3*6H_2O$, 6.5 grams of a 26.85 wt. % lanthanum nitrate solution, and 33.9 grams of a 18.4 wt. % yttrium nitrate solution with 1,000 grams of deionized (DI) water. Then, 120 grams of a 10 wt. % NaOH solution is added to the polyvalent metal-containing solution and mixed until a clear solution is formed. A total of 100 grams of a 20 wt. % $Na_2SO_4$ solution is then added to the solution containing the polymerized zirconium oligomers followed by the slow addition of a 20 wt. % NaOH solution until the basicity of the reaction mixture reaches a pH of 13. The formed precipitate is filtered using a Buchner funnel and washed with deionized water to remove excess chloride, nitrate, sulfate, and sodium ions.

The wet, collected precipitate is first dried in an oven at 130° C. for about 12 hours and then calcined in air at 800° C. for 2 hours. The calcined sample is additionally aged at 1,000° C. for 4 hours.

Cerium-zirconium mixed oxide calcined at 700° C. may be re-slurried in deionized (DI) water to make 20 wt. % slurry and then wet-ball milled using a jar mill to a particle size having $d_{50}$=280 nm. The milled cerium-zirconium mixed oxide has been dried in an electric oven at 110° C. for about 12 hours and then calcined in air at 700° C. for 2 hours. The calcined milled mixed oxide is then additionally aged at 1,000° C. for 4 hours.

Surface area and pore volume of milled and un-milled cerium-zirconium mixed oxide after calcination at 1,000° C. are summarized in the Table 2.

TABLE 2

|  | SSA-1000, $m^2/g$ | PV-1000, cc/g |
|---|---|---|
| Un-milled | 46.6 | 0.40 |
| Milled | 41.6 | 0.35 |
| Change, % | −11 | −13 |

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A nanocrystal-sized cerium-zirconium mixed oxide material comprising at least 30% by mass zirconium oxide;
   between 5% to 55% by mass cerium oxide; and
   a total of 25% or less by mass of at least one oxide of a rare earth metal selected from the group of lanthanum, neodymium, praseodymium, or yttrium;
   wherein the nanocrystal-sized cerium-zirconium mixed oxide exhibits hierarchically ordered aggregates having a $d_{50}$ particle size less than 1.5 μm and a total pore volume after calcination at a temperature of 600° C. or more that is at least 0.7 $cm^3/g$;
   wherein the nanocrystal-sized cerium-zirconium mixed oxide exhibits a specific surface area (SSA) and pore volume (PV) before and after aging at 1,000° C. or higher for at least 6 hours, such that the SSA and PV after aging is 75% or more of the SSA and PV before aging;
   wherein the mixed oxide has a pore size distribution that remains unchanged over the temperature range from 600° C. to 1.100° C.

2. The mixed oxide material of claim 1, wherein the oxide material comprises at least 40% zirconium oxide.

3. The mixed oxide material of claim 1, wherein the hierarchically ordered aggregates have a particle size that is less than 500 nm.

4. The mixed oxide material of claim 1, wherein hierarchically ordered aggregates consist of oxide crystallites having a size ranging from 5 nm to 20 nm.

5. The mixed oxide material of claim 1, wherein the SSA and PV of the mixed oxide material after aging is at least 85% of the SSA and PV before aging.

6. The mixed oxide material of claim 1, wherein the mixed oxide exhibits facile oxygen storage mobility.

7. A method of forming a nanocrystal-sized cerium-zirconium mixed oxide material according to claim 1, the method comprising the steps of:

(a) preparing an acidic solution containing polymerized zirconium oligomers;
   (b) mixing an acidic solution of cerium and rare earth salts with the zirconium oligomer containing solution to make a polyvalent metal containing mixture;
   (c) adjusting the pH of the polyvalent metal containing mixture with a base to form a clear solution;
   (d) mixing the clear solution of the acidic polyvalent metal containing mixture with a solution of a complexing reagent;
   (e) allowing the mixture formed in step (d) to form a zirconium-based precursor slurry containing constituent metal hydroxides;
   (f) neutralizing the zirconium containing precursor slurry with a base to achieve co-precipitation of the constituent metal hydroxides and formation of a precipitated mixed oxide material;
   (g) washing the precipitated mixed oxide material with water to remove unreacted cationic and anionic admixtures;
   (h) collecting the washed, precipitated mixed oxide material;
   (i) ageing the washed, precipitated mixed oxide material at ambient temperature or at an elevated temperature for a predetermined time;
   (j) drying the aged mixed oxide material;
   (k) calcining the dry, aged mixed oxide material to form the cerium-zirconium mixed oxide material; and
   (l) milling the calcined cerium-zirconium mixed oxide material to a $d_{50}$ particle size of less than 1.5 μm.

8. The method according to claim 7, wherein the milling of the calcined cerium-zirconium mixed oxide material yields a $d_{50}$ particle size of less than 500 nm.

9. The method according to claim 7, wherein the polymerized zirconium oligomers comprise zirconium octamers in an amount ranging from about 30 to 100%.

10. The method according to claim 7, wherein the polymerized zirconium oligomers do not contain zirconia sol particles.

11. The method according to claim 7, wherein the complexing reagent comprises anions that have an affinity towards zirconium; the complexing agent is selected from the group consisting of a sulfate, an oxalate, a succinate, a fumarate, and combinations thereof.

12. The method according to claim 7, wherein the amount of complexing reagent and the amount of zirconium in the acidic polyvalent metal containing mixture that form the zirconium-based precursor slurry are present such that the molar ratio of complexing agent to zirconium is in the range of about 0.35 to about 1.05.

13. The method according to claim 7, wherein the polyvalent metal-containing mixture comprises water soluble nitrates, chlorides, sulfates, acetate salts, or a combination thereof.

14. The method according to claim 7, wherein the base is selected from the group of alkali metal hydroxides, aqueous ammonia, or tetraalkylammonium hydroxide.

15. A product for industrial or automotive applications, the product comprising the nanocrystal-sized cerium-zirconium mixed oxide material according to claim 1.

16. A product for industrial or automotive applications, the product comprising the nanocrystal-sized cerium-zirconium mixed oxide material formed according to the method of claim 7.

17. The product according to claim 15, wherein the nanocrystal-sized cerium-zirconium mixed oxide material has a $D_{50}$ particle size that is less than 1.5 μm and a specific surface area (SSA) that is at least 40 $m^2/g$ after aging at 1,000° C. for 5 hours; wherein the SSA after aging is maintained to be greater than 85% of the SSA before aging.

18. The product according to claim 16, wherein the nanocrystal-sized cerium-zirconium mixed oxide material has a $D_{50}$ particle size that is less than 1.5 μm and a specific surface area (SSA) that is at least 40 $m^2/g$ after aging at 1,000° C. for 5 hours; wherein the SSA after aging is maintained to be greater than 85% of the SSA before aging.

19. The product according to claim 15, wherein the product is a solid oxide fuel cell or a particulate filter, the particulate filter being used in a flow through three-way catalytic converter (TWC) application, a gasoline particulate filter (GPF) application, or a diesel particulate filter (DPF) application.

20. The product according to claim 16, wherein the product is a solid oxide fuel cell or a particulate filter, the particulate filter being used in a flow through three-way catalytic converter (TWC) application, a gasoline particulate filter (GPF) application, or a diesel particulate filter (DPF) application.

\* \* \* \* \*